(12) United States Patent
Gendell (10) Patent No.: US 9,079,632 B2
(45) Date of Patent: Jul. 14, 2015

(54) GEAR AND LEVER TRANSMISSION SYSTEM AND METHOD

(71) Applicant: Alexander Gendell, Hoboken, NJ (US)

(72) Inventor: Alexander Gendell, Hoboken, NJ (US)

(*) Notice: Subject to any disclaimer, the term of this patent is extended or adjusted under 35 U.S.C. 154(b) by 0 days.

(21) Appl. No.: 13/986,509

(22) Filed: May 8, 2013

(65) Prior Publication Data

US 2014/0333043 A1  Nov. 13, 2014

(51) Int. Cl.
*B62M 1/30* (2013.01)

(52) U.S. Cl.
CPC .............. *B62M 1/30* (2013.01); *Y10T 74/18056* (2015.01)

(58) Field of Classification Search
CPC .............................. B62M 1/30; Y10T 74/8056
USPC ......................... 280/253, 254; 74/594.1, 594.3
See application file for complete search history.

(56) References Cited

U.S. PATENT DOCUMENTS

| 1,447,119 | A | * | 2/1923 | Brown ............................... 74/30 |
| 1,597,639 | A | * | 8/1926 | Von Glahn .................... 280/254 |
| 1,867,687 | A | * | 7/1932 | Van Etten ........................ 74/130 |
| 2,076,804 | A | * | 4/1937 | Winding ........................ 280/221 |
| 4,135,409 | A | * | 1/1979 | Ishimaru ............................ 74/76 |
| 5,351,979 | A | * | 10/1994 | Langen ........................ 280/254 |
| 5,716,069 | A | * | 2/1998 | Bezerra et al. ................ 280/254 |
| 2006/0038374 | A1 | * | 2/2006 | Montez ......................... 280/244 |

FOREIGN PATENT DOCUMENTS

GB  2241476 A  *  4/1991  ............... B62M 1/04

* cited by examiner

*Primary Examiner* — Kevin Hurley
*Assistant Examiner* — Gabriela C Craciun
(74) *Attorney, Agent, or Firm* — Douglas C. Wyatt (57) ABSTRACT

Phase gear and lever mechanism converts reciprocating power to rotary power with phase gear providing power stroke of greater duration than travel stroke so as to develop efficient power through a power stroke. A modified lever and gear mechanism converts reciprocating power to rotary power at variable out power ratio. Both converting mechanisms are applied as bicycle drive mechanisms. Both mechanisms are applied together in a bicycle one as a drive mechanism, the other for synchronizing the drive mechanism.

10 Claims, 6 Drawing Sheets

GEAR AND LEVER TRANSMISSION SYSTEM AND METHOD

PRIORITY

This application claims priority of U.S. Provisional Application Ser. No. 61/688,152, filed May 9, 2012

BACKGROUND OF THE INVENTION

This invention relates to conversion of linear motion into circular or rotary motion (or vice versa) and particularly to mechanisms for conversion.

Linear motion such as a leg pushing down on a pedal, or a cylinder travelling down a shaft defines a down and up cycle that is typically converted to circular motion by means of a crank, as for example, bicycle cranks and pedals, or a crankshaft in an automotive engine. The down and up cycle consists of a down or power stroke where energy is being applied and converted to circular motion, and an up or travel stroke. With a crank, the power and travel strokes are identical.

Figure 1:
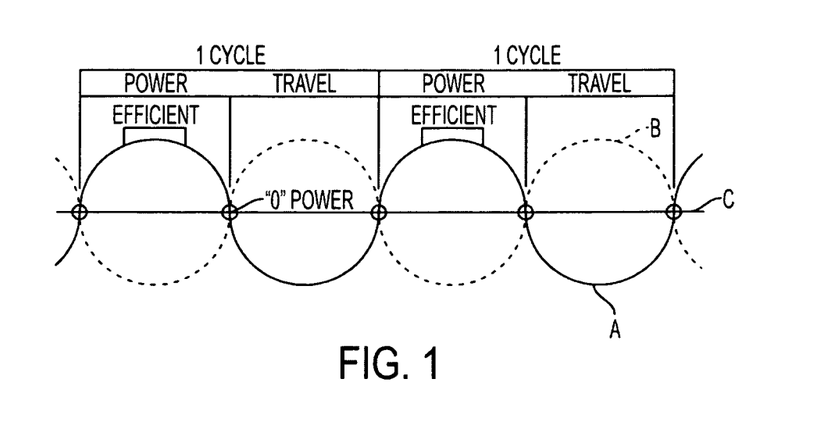
FIG. 1 is a diagram representing symmetrical power and travel strokes of conventional pedal and crank bicycle movement, or piston and crankshaft movement of an automotive engine.

The transfer of energy itself is not linear but follows the curve of a circle. FIG. 1 represents cycles of pedal and crank motion for a bicycle with power and travel of one pedal shown in solid line A, and the other pedal in dash line B. The median line C shows power and travel motion is symmetrical for each pedal. The more horizontal the curve shown in solid line, the more efficient is the energy transfer. There are only two points in a cycle at which the vector of power is applied perpendicular to the crank and where power application is 100% efficient. Also, for each cycle, there are two points where no energy is being transferred, no matter how much force is being applied. These are the "O" power positions of FIG. 1. With bicycle pedals "O" positions are overcome by legs moving back and forth as well as up and down. So, when one pedal is fully down and the other fully up, we apply forward motion to "nudge" the pedals into position where power can be applied. With an engine crankshaft, the "O" position is overcome by flywheel inertia.

SUMMARY OF THE INVENTION

The present invention provides a lever powered gear mechanism producing a transfer of energy that is many times more linear depending on the length of the lever that drives the gear. Since the lever does not need to go full circle, the lever can be as long as desired. The longer the lever, the more efficient is the mechanism.

Figure 2:
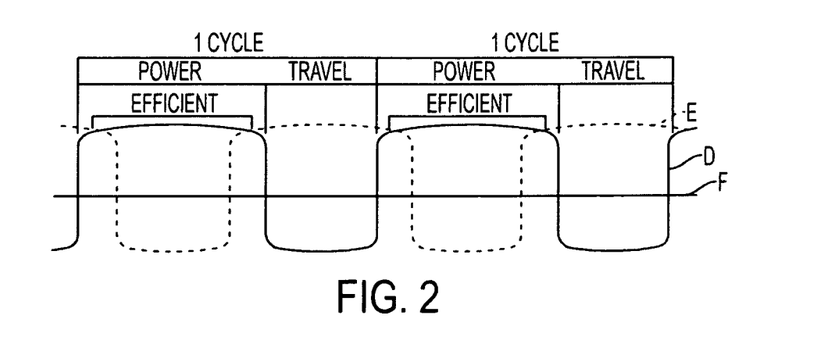
FIG. 2 is a diagram representing asymmetrical power and travel strokes of lever and phase gear power transmission system according to the invention.

The lever powered gear mechanism is characterized in a power cycle or stroke that is longer than the travel cycle or stroke, meaning that for one "rotation" of the gear there is more time that power is transferred. For each rotation of the gear there are two "O" positions. However with two gears connected to the same shaft, we have continuous power because power cycles or strokes overlap. This is because power and travel strokes are asymmetrical. In the case of a bicycle with two gears, the leg pushing down is moving slower that the leg travelling up. So at some point, both legs are pushing down at the same time. FIG. 2 of the drawing illustrates two cycles of power and travel strokes of a bicycle having two gears with solid line D representing strokes of a first gear, and dash line E a second gear. The horizontal segments of the curve shown in solid line for a first gear provide efficient energy transfer for substantially the entire power stroke. Moreover the power stroke is of greater duration than travel stroke. This is because power and travel strokes are asymmetrical as indicated by position of median line F. A second gear with travel and power strokes shown in dash line E operates in a similar manner to provide efficient energy transfer for substantially its entire power stroke. Together, the first and second gears provide continuous, efficient energy transfer from power lever to driven gear.

The phase gear that provides efficient energy transfer according to the invention is an integral gear composed of four different gear segments, with four radii corresponding to power segment, travel segment, and two joiner segments. The power segment is an internal gear, the travel segment an external gear with a radius smaller than the power segment. The joiner segments are segments of internal gears that smoothly transition from one stroke to the other. There are infinite arrangements of pivots and lever lengths as well as different aspect ratios of power and travel segments determined by geometry to meet power transmission requirements in specific applications.

The ordinary way for changing power ratios in transmission systems is by means of shifting between different physical gears in a gear box. A modified embodiment of lever powered gear mechanism of this invention allows a different system for changing the power ratio in a transmission system. In this embodiment, a lever drives a segment gear in power and travel strokes in a mechanism where lever and gear have independent pivot points, and where the lever and gear are connected by an adjustable cog. The reciprocating lever and segment gear mechanism delivers rotary motion to a driven gear. The point of cog connection between lever and segment gear is adjustable in relation to lever pivot point so as to provide a variable gear ratio between the segment gear and the driven gear. A cog point of connection closer to lever pivot point gives a higher gear ratio, and connection further from lever point gives a lower gear ratio.

The present invention has for a chief objective a lever operated gear transmission system for continuous and efficient energy transfer at fixed and variable gear ratios.

Specific examples are included in the following description for purposes of clarity, but various details can be changed within the scope of the present invention.

Objects of the Invention

An object of the invention is to provide lever and gear transmission systems for efficient energy transfer from power input to power output.

Another object of the invention is to provide a lever powered phase gear mechanism with a power stroke that is longer than the travel stroke such that for one cycle of the mechanism there is more time when power is transferred.

Another object of the invention is to provide a lever powered phase gear mechanism for a bicycle.

Another object of the invention is to provide a lever powered cog gear mechanism having variable gear ratio.

Another object of the invention is to provide a lever powered cog gear mechanism having variable gear ratio adapted for powering a bicycle.

Other and further objects of the invention will become apparent with an understanding of the following detailed description of the invention or upon employment of the invention.

BRIEF DESCRIPTION OF THE DRAWINGS

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE PREFERRED EMBODIMENT

Figure 3:
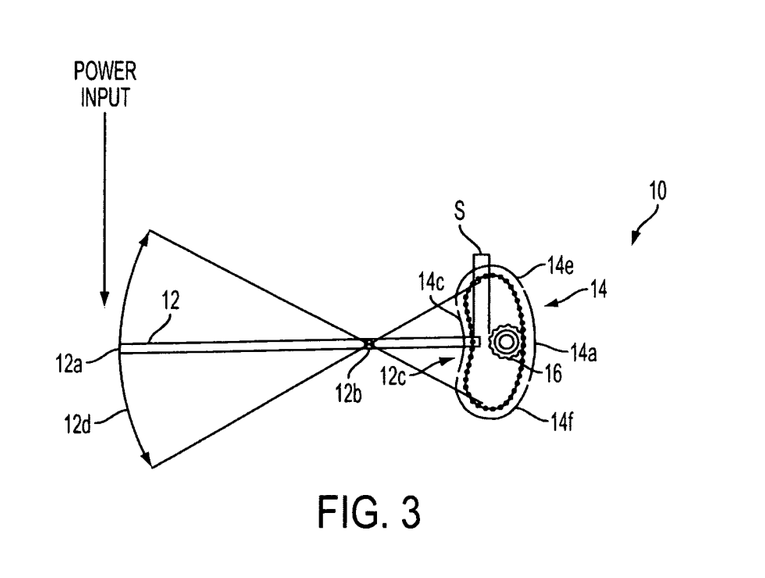
FIG. 3 is a schematic diagram of lever and phase gear power transmission system with phase gear power segment engaging a driven gear in a power stroke.
Figure 4:
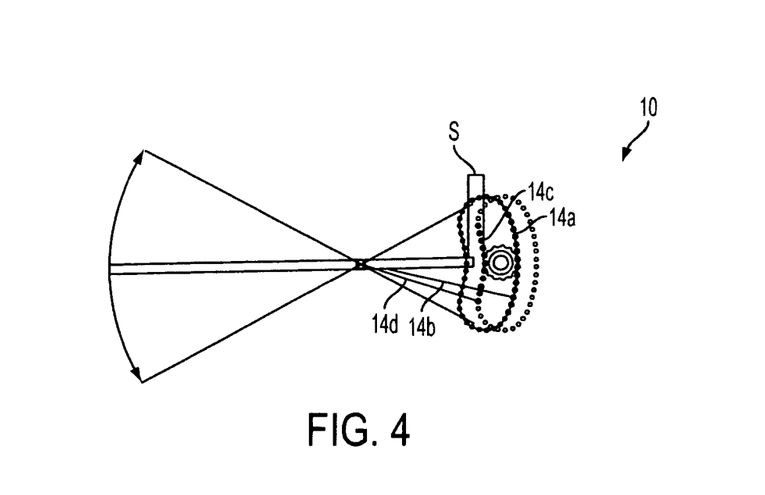
FIG. 4 is the diagram of lever and phase gear power transmission system of FIG. 3 with phase gear travel segment engaging a driven gear in a travel stroke.

Referring to the drawing, the present invention is directed to a preferred embodiment lever powered gear mechanism 10 shown in FIGS. 3 and 4 comprising power lever 12 and phase gear 14. Power lever has power input end 12a, pivot point 12b, and power output end 12c with pivot point closer to output end for increased leverage in delivering energy to phase gear 14 fixed at output end.

Phase gear comprises four different gear segments with four radii including power segment 14a with radius 14b originating at lever pivot point, travel segment 14c with radius 14d originating at lever pivot, and joiner segments 14e, 14f connecting ends of power segment with adjacent ends of travel segment. The joiner segments smoothly transition from power cycle to travel cycle and return to power cycle. When the power and travel cycles are done, phase gear shifts slightly as driven gear moves through the joiner segments. There is a parallel shift S of the phase gear induced by rotation of driven gear 16 through joiner segments. A shift is parallel as seen in FIG. 4 where power and travel segments remain parallel to their respective starting positions as they move through the shift. Where parallel shift is achieved the gear is symmetrical as in FIGS. 3 and 4.

The power segment radius 14b is greater than the travel segment radius 14d so that driven gear 16 moves faster through the power segment than the travel segment. The power stroke is of greater duration than travel stroke because of greater radius of power segment. The power segment and the travel segment are in effect two different gears as shown in FIG. 4 with bold ink illustration of power 14a and travel 14c segments. The phase gear power segment provides efficient power curve $D_p$ for each mechanism cycle as shown in FIG. 2. The travel segment with smaller radius than power segment results in shorter travel curve $D_t$ and consequent asymmetry of power and travel curves of FIG. 2 marked by line F.

Energy is developed by moving lever 12 through power input arc 12d and is transferred by phase gear power segment 14a to driven gear 16. The driven gear rotates always in the same direction, i.e., counterclockwise in FIGS. 3 and 4, as it sequentially engages power segment, joiner segment, travel segment, and joiner segment. The power segment and both joiner segments are external gears and the travel segment is an internal gear.

Figure 5A:
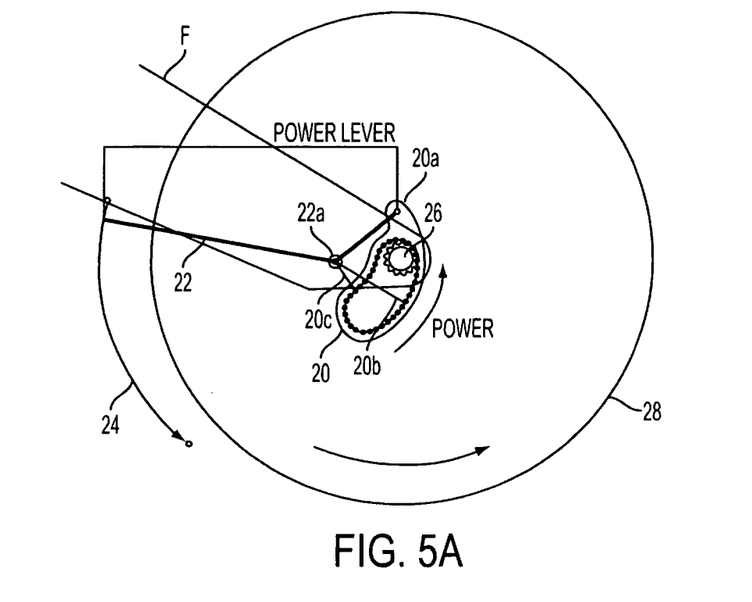
FIG. 5a is a schematic diagram of a modified embodiment of lever and phase gear power transmission system in phase for applying power to driven gear and wheel.
Figure 5B:
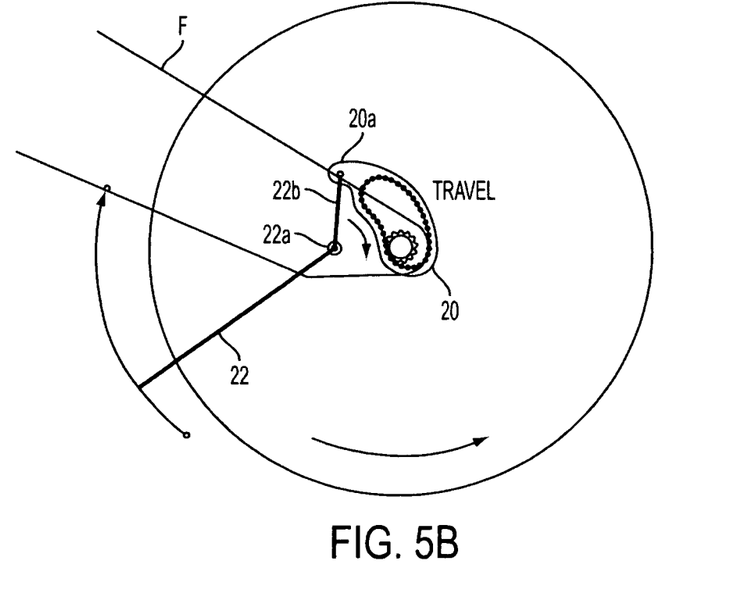
FIG. 5b is a schematic diagram of the modified embodiment of lever and phase gear power transmission system of FIG. 5a in travel phase.

Lever 12, phase gear 14, and driven gear 16 of FIGS. 3 and 4 execute cycles of power and travel seen in solid line D in FIG. 2. The horizontal segment of the solid line curve provides efficient energy transfer for substantially the entire power stroke. FIGS. 5a and 5b show a modified embodiment of the invention in providing for shift of phase gear 20 between power (FIG. 5a) and travel cycles (FIG. 5b). Gear pivot point 20a is placed outside the phase gear. Power lever 22 has pivot point 22a on machine frame F, and gear lever section 22b extending between lever pivot point 22a and gear pivot point 20a.

In moving the power lever through power stroke 24, the gear lever actuates phase gear through power segment 20b so as to turn driven gear 26 and wheel 28 in the direction of arrow W. Offset gear pivot 20a accommodates phase gear shift through joiner segment 20c to travel segment 20d, and again from joiner segment 20e to power segment 20b. When the driven gear reaches joiner segment 20c as it leaves the power segment and before it enters the travel segment, rotation of the driven gear causes the entire phase gear to pivot or shift slightly on axis 20a.

In moving the power lever through travel stroke 27, the gear lever moving in the direction of arrow G actuates phase gear through travel segment 20d so as to turn driven gear 26 through joiner segment 20e to power segment 20b. When the driven gear reaches joiner segment 20e as it leaves the travel segment rotation of the driven gear causes the entire phase gear to pivot or shift slightly on axis 20a to position of FIG. 5a.

Where shift is achieved by slight pivoting motion as in FIGS. 5a-b, the phase gear has an asymmetrical "eggplant shape".

The radius 23 (FIG. 5b) of power segment originating at lever pivot point 22a is greater than radius 25 of travel segment thereby maintaining asymmetry of power and travel cycles with power cycle being longer.

Figure 6:
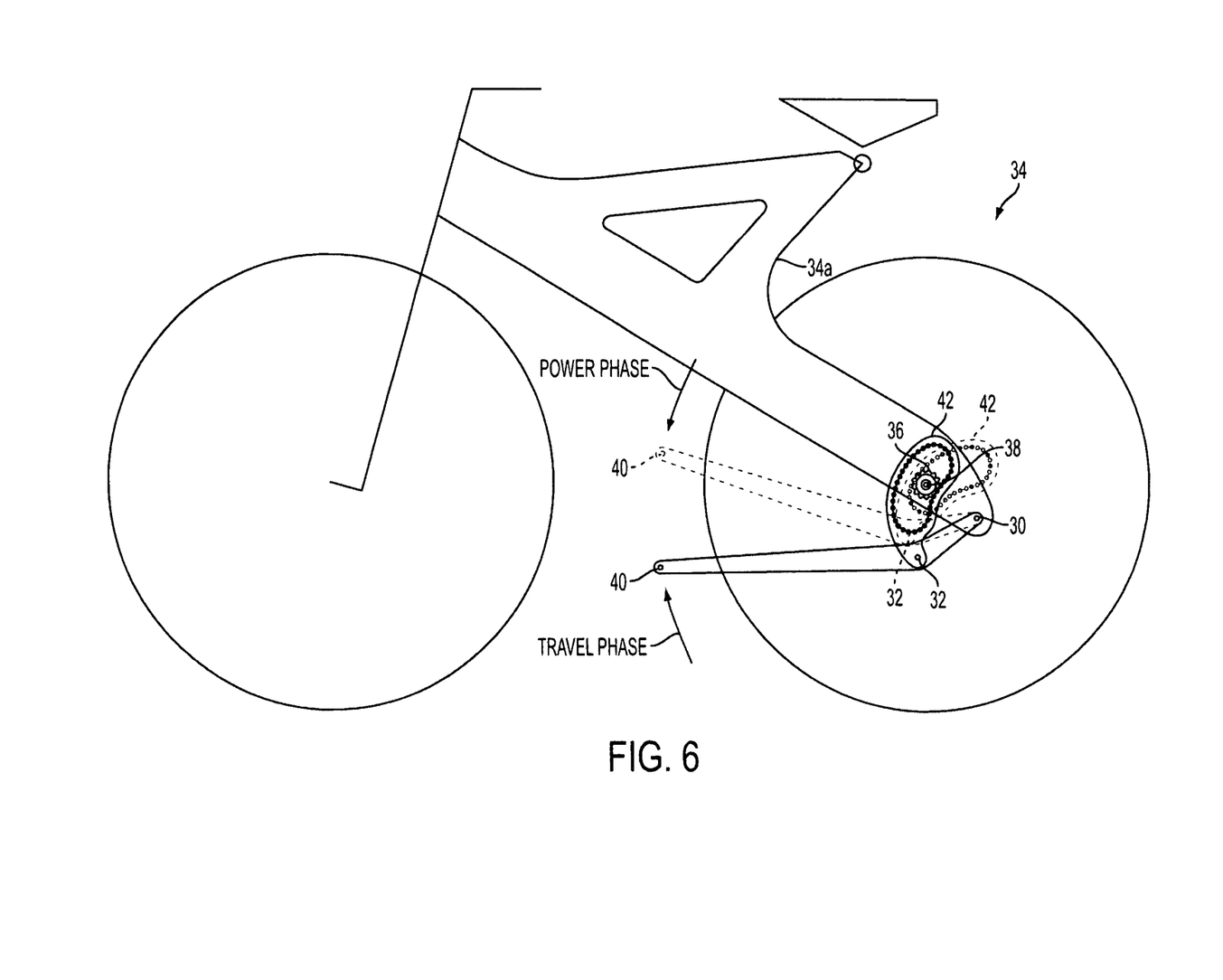
FIG. 6 is a schematic diagram of another modified embodiment of the invention illustrating a dual lever and phase gear fixed gear ratio transmission system for a bicycle.

There are infinite arrangements of pivot points and lever lengths as well as different aspect ratios of power and travel segments determined by geometry. For example, main power lever pivot 30 can be beyond the gear pivot 32 as shown in FIG. 6. In a bicycle 34 with driven gear 36 on wheel hub 38, a power lever 40 has pivot point 30 on bicycle frame F. Each offset gear pivot 32 attached to a phase gear 42 connects to a power lever 40 at a point intermediate lever ends. Movement of each power lever through power phase transfers energy to driven gear through a phase gear power segment 42a, shifts through joiner segment to travel segment, and shifts again through joiner segment to travel segment 42b.

The bicycle shown in FIG. 6 has dual power lever and phase gear drive mechanisms with one shown in full lines the other in phantom. A cycler operating these power levers develops continuous efficient power delivered to driven gear as represented by solid and dash line power curves of FIG. 2.

The full line mechanism of FIG. 6 is in travel phase moving upward with travel segment engaging driven gear. The phantom line mechanism is early in power phase moving downward with power segment engaging driven gear. In the embodiment of FIG. 6, the radius of each power segment originates at lever pivot point 30 and is greater than radius of travel segment so as to maintain asymmetry of power and travel cycles with power cycle being longer. It is to be understood in observing the position of each phase gear in FIG. 6 that by reason of asymmetry of power and travel cycles of the mechanism, both power levers will be in power phase for a portion of mechanism operation. The phase gears of FIG. 6 shift slightly between power and travel cycles by driven gear rotation in substantially the same manner as for mechanism of FIGS. 5a-b.

Figure 7:
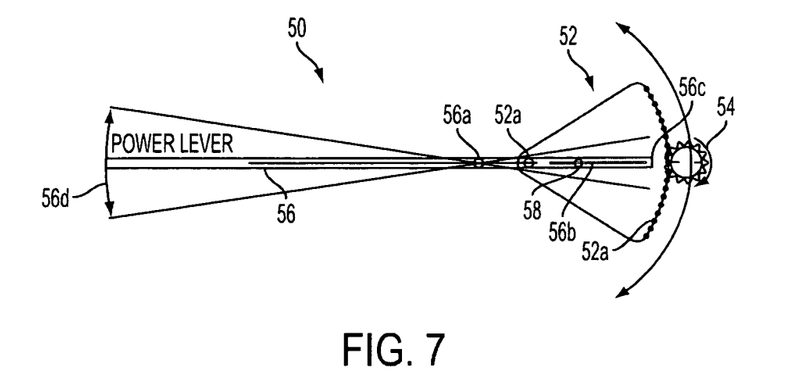
FIG. 7 is a schematic diagram of another modified embodiment of the invention illustrating a lever and segment gear mechanism with variable gear ratio for driven output gear.
Figure 8:
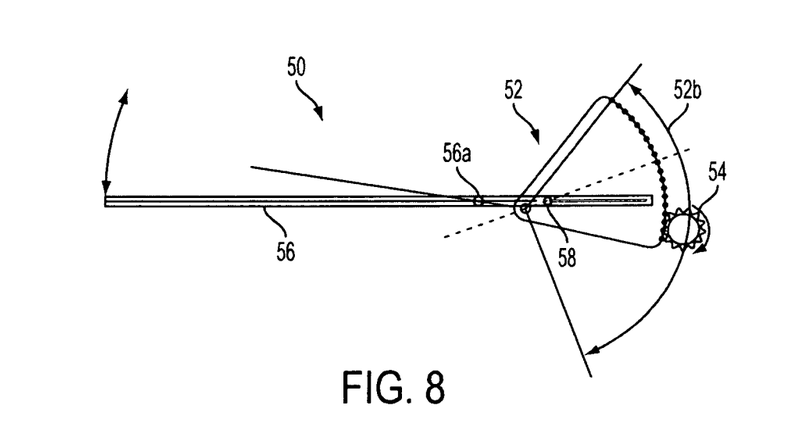
FIG. 8 is a schematic diagram of mechanism of FIG. 7 with high gear ratio for driven output gear.
Figure 9:
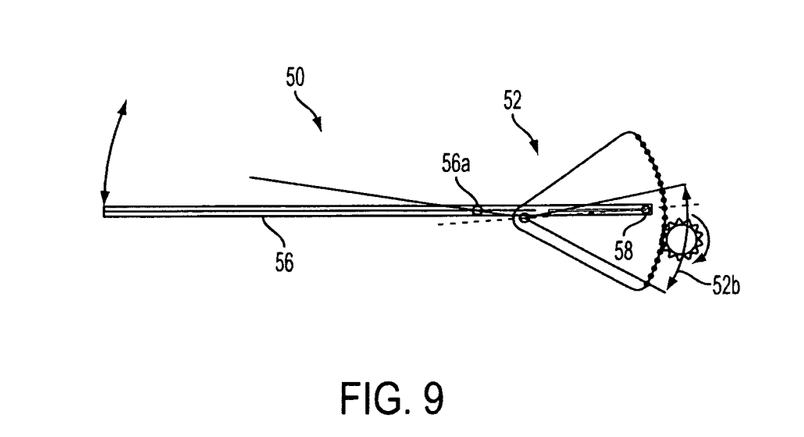
FIG. 9 is a schematic diagram of mechanism of FIG. 7 with low gear ratio for driven output gear.

A lever powered gear mechanism of this invention provides means for changing the power ratio in a transmission system and is shown in FIGS. 7-9. With lever 50 power transmission, a drive gear 52 does not go full circle, but moves back and forth. The drive gear is "pie" shaped gear segment, with gear teeth 52a fully meshed with teeth of driven gear 54. Power lever 56 has pivot point 56a and cog track 56b, with the cog track situated between pivot point and output end 56c of lever. A pie shaped drive gear segment moved by power lever has gear pivot 52a independent of the lever pivot point and clear of lever movement. The center of rotation of the lever is offset from the center of rotation of the drive gear, and the power lever has fixed arc of travel 56d.

The power lever is provided with a cog 58 moveable along the cog track, and with the cog in engagement with the drive gear 52. By moving the cog to change its point of connection to the drive gear, the arc of travel 52b of the drive gear changes and the cog controls gear ratio of the mechanism. When the cog 58 is closer to the center of rotation 56a of the lever (FIG. 8), the drive gear arc of movement is greater. The arc of movement is smaller when the cog 58 is further away from the center of rotation 56a (FIG. 9). Thus, moving the cog closer to center of rotation results in a higher ratio between travel of lever and the travel of the drive gear. By positioning the cog further away results in a lower ratio between lever and drive gear. Since there is an infinite number of possible positions of the cog, there is an infinite number of ratios. There is slight slippage on the cog since the drive gear and power lever have different centers of rotation, however, that slippage is relatively minor.

Figure 10:
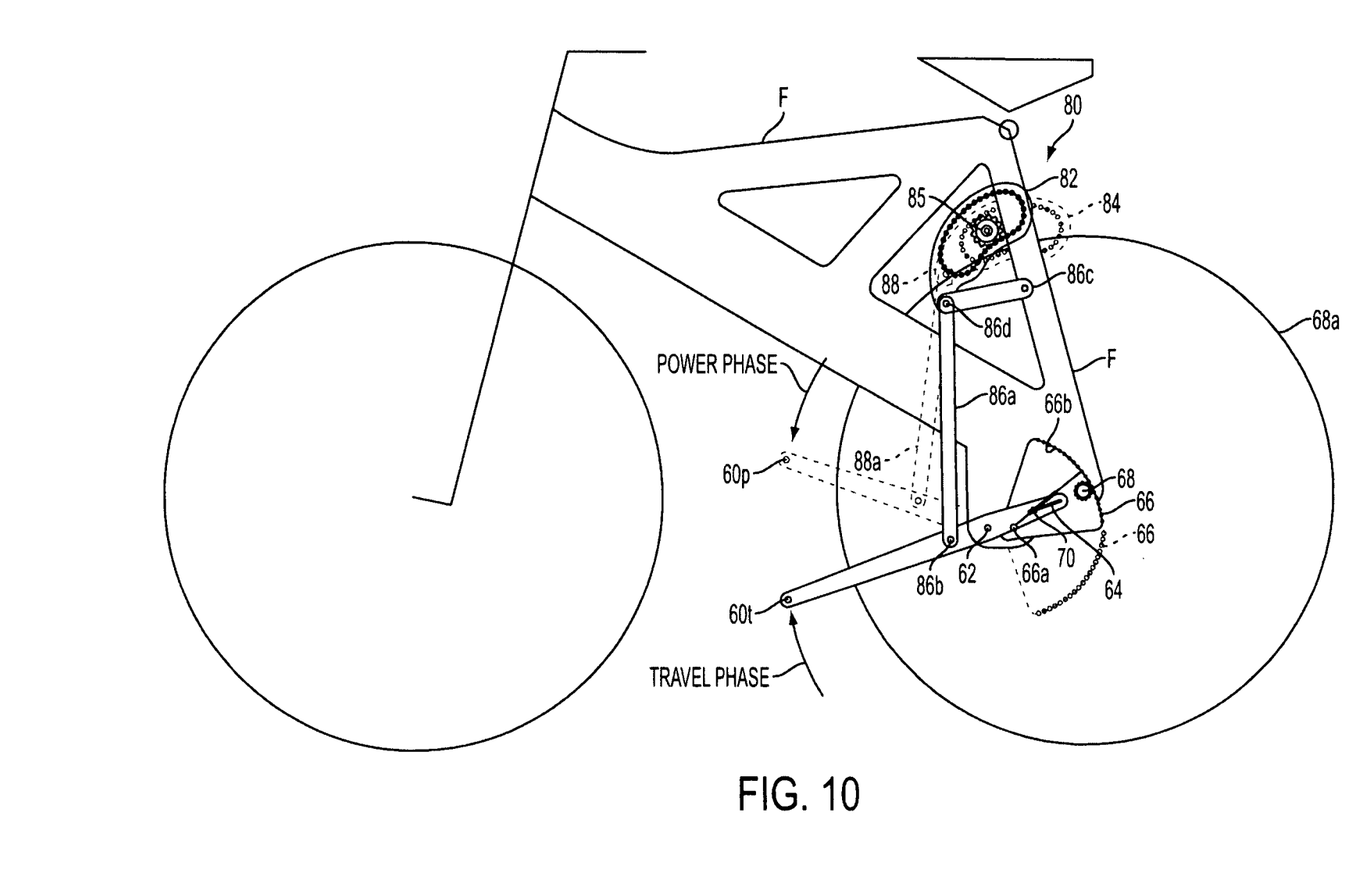
FIG. 10 is a schematic diagram of bicycle having dual main power lever and ratio segment gear mechanism of FIGS. 7-9 together with auxiliary phase gear and lever mechanism for synchronizing movement of main power levers.

FIG. 10 illustrates a bicycle with rear wheel driven by dual lever gear mechanism similar to that of FIGS. 7-9, including main power levers 60p-t with power lever pivots 62 on bicycle frame F, and with cog tracks 64. Drive gears 66 are "pie" shaped segments with pivots 66a on bicycle frame and with internal gear segments 66b for rotating driven gear mounted on wheel hub 68. The gear ratio is controlled according to position of cogs 70 in cog tracks as point of connection between power levers and drive gears. A cyclist powers the bicycle with up and down movement of power levers and selected gear ratio.

Up and down action of the power levers is synchronized by phase gear and lever mechanisms 80. The phase gear and lever mechanisms do not drive anything and instead receive reciprocating up and down movement by means of their lever connections to main power levers.

The dual phase gear and lever mechanisms 80 synchronize power and travel strokes of main power levers so there is constant power applied to wheel hub 68 and wheel 68a.

The dual phase gear and lever mechanisms 80 share synchronizing gear 85 mounted on a gear hub fixed to the bicycle frame, with gear teeth engaging each phase gear 82, 84 as shown in FIG. 10.

The first phase gear and lever mechanism 86 comprises lever 86a with pivot attachment 86b to main power lever 60t and pivot attachment 86c to the frame. There is also lever pivot 86d to phase gear 82.

The second phase gear and lever mechanism 88 comprises the same lever components and attachments as the first mechanism. The first and second phase gears and lever mechanisms are at different stages in power and travel strokes by reason of their linkage to main power levers at different stages.

So, as seen in FIG. 10, as main power lever 60p moves downward in power stroke and pulls second lever 88a, the power segment of second phase gear 84 engages and turns synchronizing gear 85. At the same time, the synchronizing gear engages and drives the travel segment of first phase gear 82 causing it to move to the right, and by means of lever 86a, to move main power lever 60t in upward travel stroke.

The result is that since main power levers 60p-t and their segment gears do not travel full circle, the dual synchronizing phase gear and lever mechanisms each act as a free wheel so that main power levers move freely through travel strokes to starting position for next power stroke.

The bicycle of FIG. 10 is driven by dual main lever and gear power with variable gear ratio selected by position of gear ratio control cog in cog track, and with drive levers synchronized in power and travel strokes by dual phase gear and lever mechanisms. The bicycle's main power drive arrangement is such that different gear ratios may be selected for each main lever according to its gear ratio control cog setting.

Various changes may be made to the structure embodying the principles of the invention. For example, it can be appreciated that an alternative embodiment of an ear gear according to the invention includes a gear wherein the gear segments are inverted so that the phase gear is a mostly external rather than an internal gear. Because of the involute geometry of the teeth, this alternative may be preferable when the driven gear is much smaller in proportion to the phase gear. In addition, or in the alternative, another example of an alternative embodiment of a level according to the invention is in the case of the vari-lever driving the wheel, and the phase-gear acting only as a syncing mechanism as shown in FIG. 10. Such an embodiment can be provided to have a 1 way clutch (freewheel) inside the driven gear. The foregoing embodiments are set forth in an illustrative and not in a limiting sense. The scope of the invention is defined by the claims appended hereto.

I claim:

1. A phase gear for converting reciprocating motion to rotary motion and delivering such rotary motion to a driven gear, the phase gear comprising a power segment, a travel segment, a first joiner segment between power segment and travel segment, and a second joiner segment between travel segment and power segment, the four segments joined to define a continuous gear surface, each segment having a radius of curvature, the power segment having a greater radius than the travel segment so that engagement of phase gear and driven gear is of longer duration in the power segment than in the travel segment.

2. A phase gear and lever mechanism for converting reciprocating power to rotary power and delivering the converted power to a driven gear, the mechanism comprising an elongate lever having a pivot point, a power input end and a power output end, a phase gear connected to the power output end of the lever, the phase gear having a continuous gear surface including power segment, travel segment, first joiner segment between power segment and travel segment, and second joiner segment between travel segment and power segment, the power segment and the travel segment each having a radius of curvature originating at the lever pivot point, and the power segment having a greater radius than the travel segment.

3. A phase gear and lever mechanism as defined in claim 2 in which the power segment and each joiner segment have internal gear surfaces, and the travel segment has an external gear surface.

4. A phase gear and lever mechanism as defined in claim 2 in which the driven gear has a fixed axis and the phase gear shifts as the driven gear sequentially engages power segment, a joiner segment and the travel segment.

5. A phase gear and lever mechanism as defined in claim 2 in which the lever defines a straight line.

6. A phase gear and lever mechanism for converting reciprocating power to rotary power and delivering converted power to a driven gear, the mechanism comprising a lever having a pivot point for the lever to develop reciprocating power, a phase gear having a continuous gear surface including power segment, travel segment, first joiner segment between power segment and travel segment, and second joiner segment between travel segment and power segment, the phase gear having an offset gear pivot connected the lever to shift the phase gear between power segment and travel segment engagement with the driven gear, the power segment and the travel segment each having a radius of curvature originating at the lever pivot point, and the power segment having a greater radius than the travel segment.

7. A phase gear and lever mechanism as defined in claim 6 in which the gear pivot is connected to the end of the lever.

8. A bicycle powered by a dual phase gear and lever mechanisms for converting reciprocating power to rotary power and delivering converted power to a driven gear on a bicycle wheel, each of the dual mechanisms comprising a main power lever having a pivot point for the lever to develop reciprocating power, a phase gear having a continuous gear surface including power segment, travel segment, first joiner segment between power segment and travel segment, and second joiner segment between travel segment and power segment, the phase gear having an offset gear pivot connected the lever to shift the phase gear between power segment and travel segment engagement with the driven gear, the power segment and the travel segment each having a radius of curvature originating at the lever pivot point, the power segment having a greater radius than the travel segment, and the main power levers being arranged to operate together so as to deliver continuous power to the bicycle wheel through the driven gear.

9. A lever and gear mechanism for converting reciprocating motion to rotary motion and for delivering such motion to a driven gear, the mechanism comprising an elongate lever having a pivot point intermediate its ends and having a cog track near one end, a segment gear having a gear surface defining a segment of a circle, a pivot point for the segment gear spaced radially from the gear surface, and a cog disposed to move to a fixed position in the cog track during a portion of a travel stroke and there to be connected to the segment gear whereby reciprocating movement of the lever about its pivot point moves the gear segment about its pivot point for delivering rotary motion to the driven gear engaged with the segment gear surface, and whereby a gear ratio between a segment gear surface and the driven gear is varied by varying position of the cog in the cog track.

10. A bicycle with a power wheel, wheel driven gear, and frame having a lever and gear mechanism for delivering power to the wheel, the mechanism comprising dual elongate main power levers each having a pivot point on the frame, each lever having a cog track, dual segment gears each having a gear surface defining a segment of a circle, the dual segment gears engaging the wheel driven gear, pivot points on the frame for each segment gear, each gear pivot point being spaced radially from the gear surface, and dual cogs each disposed to move to a fixed position in the cog track during a portion of a travel stroke and there to be connected to a segment gear, whereby reciprocating movement of the lever about its pivot point moves the gear segment about its pivot point for delivering rotary motion to the wheel driven gear, dual mechanisms for synchronizing power and travel strokes of the main power levers, each synchronizing mechanism having a synchronizing having a pivot point on a main power lever and an end connected to the frame, a phase gear having an offset gear pivot connected the lever, the phase gear having a continuous gear surface including power segment, travel segment, first joiner segment between power segment and travel segment, and second joiner segment between travel segment and power segment, the dual synchronizing mechanisms engaging a synchronizing gear whereby a power stroke of one main power lever turns the synchronizing gear to free wheel the other main power lever through its travel stroke.

* * * * *